(12) United States Patent
Yanagawa et al.

(10) Patent No.: US 8,549,221 B2
(45) Date of Patent: Oct. 1, 2013

(54) RAID MANAGEMENT APPARATUS, RAID MANAGEMENT METHOD, AND COMPUTER PRODUCT

(75) Inventors: Toshihide Yanagawa, Kawasaki (JP); Hiroshi Yazawa, Kawasaki (JP); Yoshio Ookubo, Kanazawa (JP); Masato Yamagami, Kawasaki (JP); Himiko Kaneko, Kawasaki (JP); Masaru Shibata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 775 days.

(21) Appl. No.: 11/807,339

(22) Filed: May 25, 2007

(65) Prior Publication Data

US 2007/0260816 A1  Nov. 8, 2007

Related U.S. Application Data

(63) Continuation of application No. PCT/JP2004/017732, filed on Nov. 29, 2004.

(51) Int. Cl.
*G06F 13/00* (2006.01)

(52) U.S. Cl.
USPC ......................................................... 711/114

(58) Field of Classification Search
USPC ......................................................... 711/114
See application file for complete search history.

(56) References Cited

U.S. PATENT DOCUMENTS

| | | | |
|---|---|---|---|
| 6,745,281 B1 | 6/2004 | Saegusa | |
| 2003/0074417 A1* | 4/2003 | Kasako et al. | 709/217 |
| 2005/0021908 A1* | 1/2005 | Ohno et al. | 711/114 |

FOREIGN PATENT DOCUMENTS

| | | |
|---|---|---|
| JP | 01118921 | 5/1989 |
| JP | 01-166124 | 6/1989 |
| JP | 09-305558 | 11/1997 |
| JP | 10-320286 | 12/1998 |
| JP | 2000-099360 | 4/2000 |
| JP | 2001-14261 | 1/2001 |
| JP | 2003-084917 | 3/2003 |
| JP | 2003-330781 | 11/2003 |
| WO | WO99/26138 | 5/1999 |

OTHER PUBLICATIONS

Japanese Office Action mailed Jun. 22, 2010, and issued in corresponding Japanese Application No. 2006-546520.
"SafeDISK V1.0 instruction manual PRIMERGY/GRANPOWER5000;" Fujitsu Limited, Jun. 30, 2001, 1$^{st}$ edition; pp. 23-27, 48-55, 199-212.
Japanese Interrogation issued in corresponding Japanese Patent App. No. 2006-546520, dated Jul. 15, 2011.

* cited by examiner

*Primary Examiner* — Edward Dudek, Jr.
(74) *Attorney, Agent, or Firm* — Greer, Burns & Crain, Ltd.

(57) ABSTRACT

In a first management unit for a redundant array of independent disks (RAID management unit), a shared-class setting unit receives a shared-class setting command, for example, from a host computer. If the shared-class setting command includes information about the first RAID management unit and a second RAID management unit, a shared management-information creating unit creates shared management information, writes the created shared management information onto a first disk, notifies the second RAID management unit corresponding to a second disk about the shared management information, and gives an instruction to write the shared management information onto the second disk. The second RAID management unit then writes the notified shared management information onto the second disk.

5 Claims, 6 Drawing Sheets

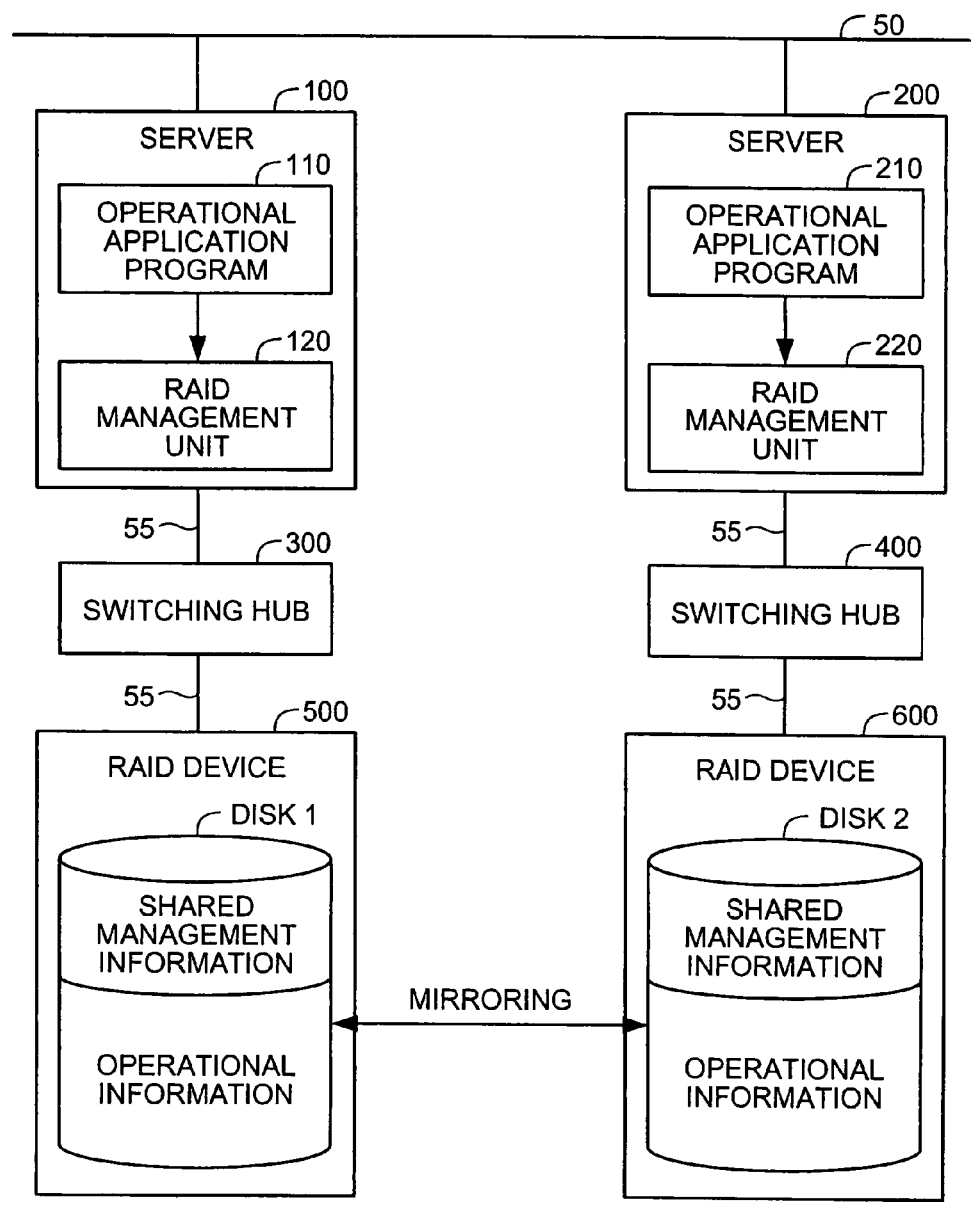

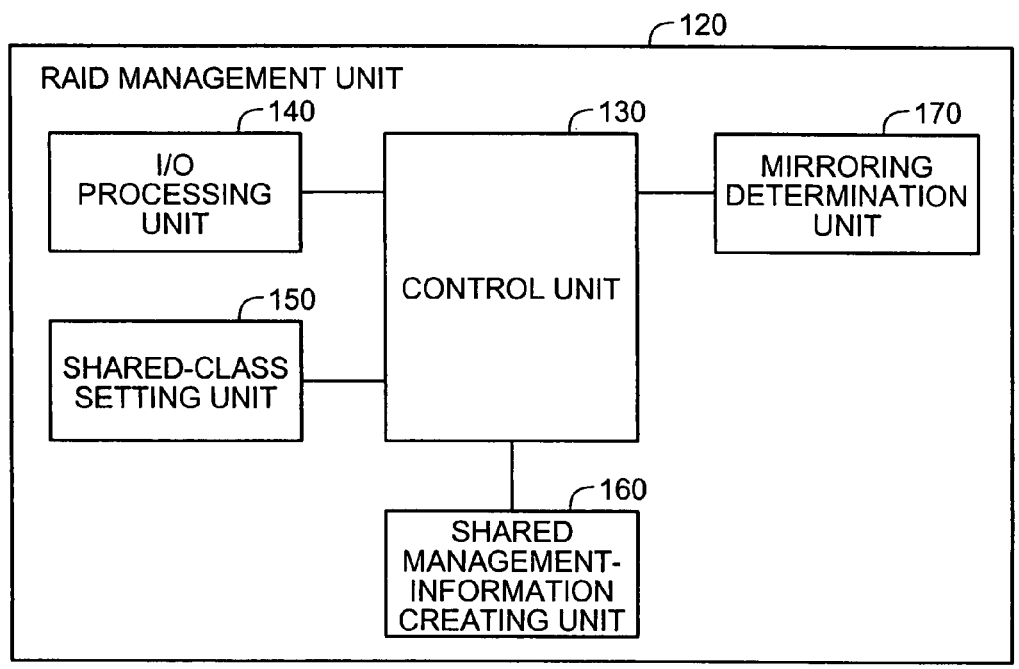

FIG.4

| OBJ | NAME | TYPE | SCOPE | SPARE | | | | | |
|---|---|---|---|---|---|---|---|---|---|
| class | class0001 | shared | nodeA:nodeB | 0 | | | | | |

| OBJ | NAME | TYPE | CLASS | GROUP | DEVNAM | DEVBLKS | DEVCONNECT | STATUS | |
|---|---|---|---|---|---|---|---|---|---|
| disk | disk0001 | switch | class0001 | group0001 | c0t9d0 | 17596416 | nodeA | ENABLE | |
| disk | disk0002 | switch | class0001 | group0001 | * | 0 | (*) | ENABLE | |

| OBJ | NAME | CLASS | DISKS | BLKS | FREEBLKS | SPARE | MASTER | TYPE | WIDTH | ACTDISK |
|---|---|---|---|---|---|---|---|---|---|---|
| group | group0001 | class0001 | disk0001:disk0002 | 8290304 | 8192000 | * | * | switch | * | disk0001 |

| OBJ | NAME | CLASS | GROUP | SKIP | JRM | 1STBLK | LASTBLK | BLOCKS | STATUS |
|---|---|---|---|---|---|---|---|---|---|
| volume | * | class0001 | group0001 | * | * | 0 | 65535 | 65536 | PRIVATE |
| volume | volume0001 | class0001 | group0001 | * | * | 65536 | 98303 | 32768 | ACTIVE |
| volume | * | class0001 | group0001 | * | * | 98304 | 8290303 | 8192000 | FREE |

| OBJ | CLASS | GROUP | DISK | VOLUME | STATUS |
|---|---|---|---|---|---|
| slice | class0001 | group0001 | disk0001 | volume0001 | ACTIVE |

FIG.5

```
# /usr/symcli/bin/symrdf -g Rdf1Grp2 query

Device Group (DG) Name    : Rdf1Grp2
DG's Type                 : RDF1
DG's Symmetrix ID         : 000187401214

Source (R1) View          Target (R2) View    MODES
------------------------------   ---------------------   -----
            ST              LI   ST
Standard    A               N    A
Logical     T  R1 Inv R2 Inv K   T  R1 Inv R2 Inv    RDF Pair
Device Dev  E  Tracks Tracks S Dev E Tracks Tracks MDA STATE
------------------------------   ---------------------   -----

DEV001 0067 RW   0       0   RW 0199 WD   0    0 S.. Synchronized
DEV002 0069 RW   0       0   RW 019B WD   0    0 S.. Synchronized
DEV003 006A RW   0       0   RW 019C WD   0    0 S.. Synchronized
DEV004 006B RW   0       0   RW 019D WD   0    0 S.. Synchronized
DEV005 006C RW   0       0   RW 019E WD   0    0 S.. Synchronized
DEV006 006D RW   0       0   RW 019F WD   0    0 S.. Synchronized
DEV007 006E RW   0       0   RW 01A0 WD   0    0 S.. Synchronized
DEV008 006F RW   0       0   RW 01A1 WD   0    0 S:.. Synchronized
DEV009 0070 RW   0       0   RW 01A2 WD   0    0 S.. Synchronized
DEV010 0071 RW   0       0   RW 01A3 WD   0    0 S.. Synchronized Total      --------  --------        --------  --------
 Track(s)      0        0                0        0
 MB(s)        0.0      0.0              0.0      0.0

Legend for MODES:

M(ode of Operation): A = Async, S = Sync, E = Semi-sync, C = Adaptive Copy
D(omino)        : X = Enabled, . = Disabled
A(daptive Copy) : D = Disk Mode, W = WP Mode, . = ACp off
```

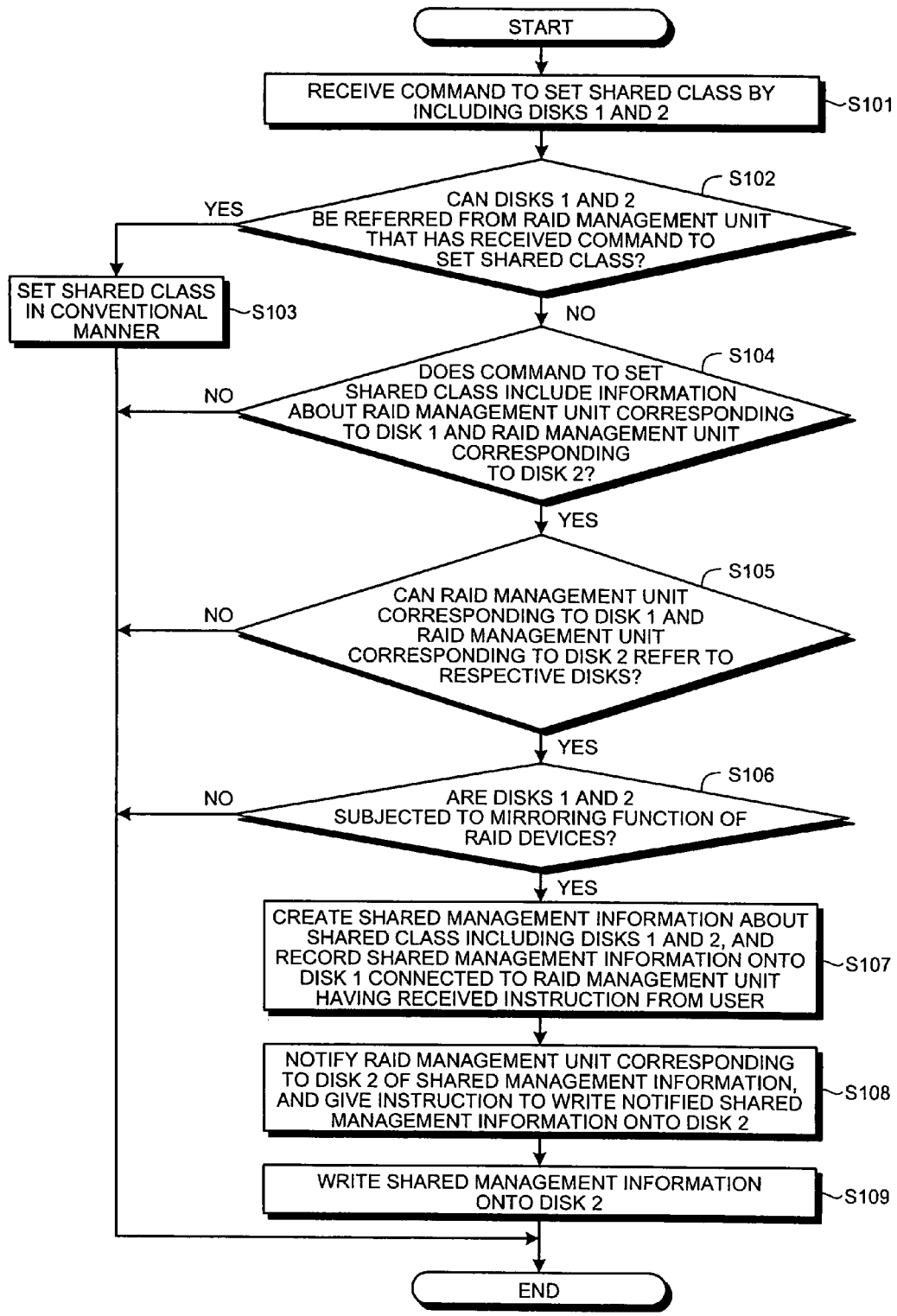

RAID MANAGEMENT APPARATUS, RAID MANAGEMENT METHOD, AND COMPUTER PRODUCT

This application is a continuation application filed under 35 U.S.C. Section 111(a) of International Application PCT/JP2004/017732, filed Nov. 29, 2004.

BACKGROUND OF THE INVENTION

1. Field of the Invention

The present invention generally relates to a technology for management of a RAID management apparatus that performs mirroring among a plurality of disks.

2. Description of the Related Art

To avoid data loss caused by a trouble on a disk (such as a disk crash), one of currently known technologies is a device of redundant array of independent disks (RAID) that improves data security by performing mirroring among a plurality of disks.

Conventionally, when writing data onto a disk included in a RAID device or when executing mirroring between disks, another device, a volume manager is used to manage the RAID device and maintain synchronization between the disks. However, along with the recent enhancement of functions provided by a RAID device itself, a RAID device independently executes mirroring, and copies data as it is from a copy source disk directly onto a copy destination disk (for example, see Japanese Patent Application Laid-open No. H09-305558).

However, according to the conventional technology, because a RAID device independently executes mirroring, and copies data as it is from a copy source disk directly onto a copy destination disk, there is a problem that individual management information for the copy destination disk is destroyed so that the copy destination disk becomes unavailable to be accessed, and a shared class cannot be set by including the copy source disk and the copy destination disk.

SUMMARY OF THE INVENTION

It is an object of the present invention to at least partially solve the problems in the conventional technology.

According to an aspect of the present invention, a computer-readable recording medium that stores therein a computer program for managing a plurality of devices used for a redundant array of independent disks (RAID devices) configured to perform reciprocal mirroring causes a computer to execute acquiring node information about nodes connected to respective RAID devices, the nodes being configured to write data onto the independent disks included in the respective RAID devices; and setting a shared class by including the independent disks connected to each other via the nodes across the RAID devices based on the node information.

According to another aspect of the present invention, a method of managing a plurality of devices used for a redundant array of independent disks (RAID devices) configured to perform reciprocal mirroring includes acquiring node information about nodes connected to respective RAID devices, the nodes being configured to write data onto the independent disks included in the respective RAID devices; and setting a shared class by including the independent disks connected to each other via the nodes across the RAID devices based on the node information.

According to still another aspect of the present invention, a RAID management apparatus that manages a plurality of devices used for a redundant array of independent disks (RAID devices) configured to perform reciprocal mirroring includes an acquiring unit that acquires node information about nodes connected to respective RAID devices, the nodes being configured to write data onto the independent disks included in the respective RAID devices; and a setting unit that sets a shared class by including the independent disks connected to each other via the nodes across the RAID devices based on the node information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic block diagram of a system configuration of a RAID management system according to an embodiment of the present invention;

FIG. 2 is a functional block diagram of a RAID management unit shown in FIG. 1;

FIG. 3 is a schematic diagram of an example of shared-class setting commands according to the embodiment;

FIG. 4 is a schematic diagram of an example of shared management information created by a shared management-information creating unit shown in FIG. 2;

FIG. 5 is a schematic diagram of an example of mirroring information;

FIG. 6 is a flowchart of a process procedure of setting a shared class by the RAID management unit shown in FIG. 2.

DETAILED DESCRIPTION OF THE PREFERRED EMBODIMENTS

Figure 7:
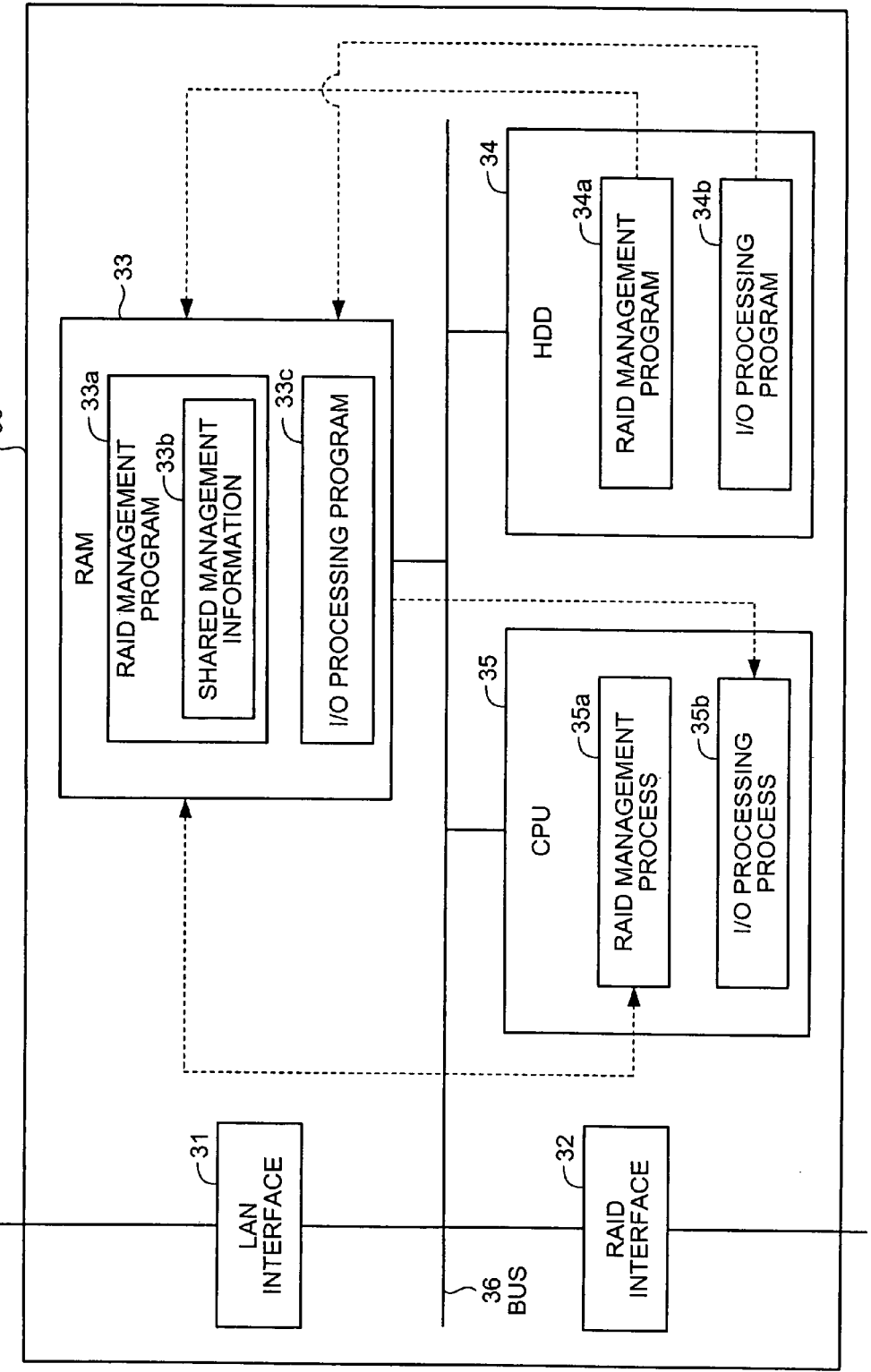
FIG. 7 is a schematic diagram of a computer that executes a RAID management program.

Exemplary embodiments of the present invention will be explained below in detail with reference to accompanying drawings.

First of all, a concept of management of redundant array of independent disks (RAID) according to an embodiment of the present invention is explained below. A RAID management unit according to the embodiment creates management information for a plurality of disks to share, causes each of the disks to store therein the created shared management information, and sets a shared class by including a disk directly connected to the RAID management unit and a disk connected to the RAID management unit via other device(s). The management information is information for managing a disk.

A system configuration of a RAID management system according to the embodiment is explained below. As shown in FIG. 1, in the RAID management system, a server 100 is connected to a switching hub 300 with a fiber channel cable 55, and the switching hub 300 is connected to a RAID device 500 with the fiber channel cable 55.

A server 200 is connected to a switching hub 400 with the fiber channel cable 55, and the switching hub 400 is connected to a RAID device 600 with the fiber channel cable 55. The server 100 and the server 200 are connected to each other with a local area network (LAN) 50.

The server 100 executes various operational application programs, and manages the RAID device 500. The server 100 includes an operational application program 110 and a RAID management unit 120.

The operational application program 110 is a software application program for performing a certain operation. The RAID management unit 120 manages the RAID device 500, and sets a shared class by including a disk 1 included in the RAID device 500 and a disk 2 included in the RAID device 600.

The RAID management unit 120 creates management information available to be shared for use on both of the disks 1 and 2 (hereinafter, "shared management information"), and writes the created shared management information onto the disk 1.

Thus, even though the RAID device 500 and the RAID device 600 independently execute mirroring, and data on the disk 1 is copied as it is directly onto the disk 2, management information on the disk 2 is not destroyed, so that the disk 2 can be accessed after copying.

The switching hub 300 provides a data exchange between the server 100 and the RAID device 500.

The RAID device 500 includes the disk 1 for storing therein data (the disk 1 stores therein shared management information and operational information), and independently executes mirroring with the RAID device 600. The operational information is information about operation created by, for example, the operational application program 110. When the disk 1 is a copy source, while the disk 2 is a copy destination, the RAID device 500 copies data recorded on the disk 1 onto the disk 2.

Explanations of the server 200 including an operational application program 210 and a RAID management unit 220, the switching hub 400, and the RAID device 600 are omitted because they are similar to the server 100, the switching hub 300, and the RAID device 500.

Configuration of the RAID management unit 120 shown in FIG. 1 is explained below. As shown in FIG. 2, the RAID management unit 120 includes a control unit 130, an input-output (I/O) processing unit 140, a shared-class setting unit 150, a shared management-information creating unit 160, and a mirroring determination unit 170.

The control unit 130 controls the RAID management unit 120 as a whole. The I/O processing unit 140 writes operational information received from the operational application program 110 onto the disk 1, and reads information written on the disk 1.

When the shared-class setting unit 150 receives a command to set a shared class (hereinafter, "shared-class setting command"), the shared-class setting unit 150 sets a shared class by including disks specified by the shared-class setting command.

In an example of shared-class setting commands shown in FIG. 3, "c Class0001" represents the name of a class to be newly created, "d nodeA.clt1d0=DISK1" represents information about a physical disk (c1t1d0) included in the class (c Class0001), a logical name (DISK1) corresponding to the physical disk, and the server 100 (node A), which can physically refers to the disk even in the shared class. DISK1 in FIG. 3 corresponds to the disk 1 in FIG. 1.

Subsequently, "a type=shared.scope=nodeA:nodeB" represents that the class (c Class0001) to be newly created is to be shared between the node A and a node B, which are specified with scope, i.e., the servers 100 and 200.

On the second line, "d nodeB.clt2d0=DISK2" represents information about a physical disk (clt2d0) to be added into the class (c Class0001), a logical name (DISK2) corresponding to the physical disk, and the server 200 (node B), which can physically refers to the disk even in the shared class. DISK2 in FIG. 3 corresponds to the disk 2 in FIG. 1.

Subsequently, "e chkps" represents that it is not to be checked whether DISK2 can be referred from the servers 100 and 200 specified by "a type=shared.scope=nodeA:nodeB", when adding DISK2 into the shared class.

A conventional shared-class setting command includes only information about disks set in a shared class and nodes that use the shared class. However, as described above, a shared-class setting command according to the embodiment includes information about corresponding relation between disks to be set in a shared class and nodes that can refer to the disks, so that shared management information, which will be described later, can be created. The shared-class setting unit 150 passes to the shared management-information creating unit 160 the information about the corresponding relation between the disks to be set in a shared class and the nodes that can refer to the disks.

The shared management-information creating unit 160 creates shared management information based on the information about the corresponding relation between the disks to be set in a shared class and the nodes that can refer to the disks, and writes the created shared management information onto the disk 1. Moreover, the shared management-information creating unit 160 notifies the RAID management unit 220 corresponding to the disk 2 about the created shared management information, and gives an instruction to write the notified shared management information onto the disk 2.

FIG. 4 presents an example of shared management information when the information is referred from the server 100. In FIG. 4, "nodeA:nodeB" represents that the class is shared between the servers 100 and 200.

DEVCONNECT represents relation between a node and a device. A line on which DEVCONNECT is set to "nodeA" represents that "nodeA" (the server 100) corresponds to disk0001 (the disk 1), and that "nodeB" (the server 200) cannot refer to disk0001. A line on which DEVCONNECT is set to "*" represents that node corresponding to disk0002 (the disk 2) is unknown. A line on which ACTDISK is set to "disk0001" represents that a currently accessible disk is disk0001.

Conventionally, individual management information about a disk is created. However, the shared management-information creating unit 160 according to the embodiment of the present invention creates shared management information that contains information, such as information about corresponding relation between a node and a disk. The shared management information can be effective on both of the disks 1 and 2, so that the disk 2 can be accessed even when data on the disk 1 is copied as it is directly onto the disk 2.

The mirroring determination unit 170 acquires information about mirroring (hereinafter, "mirroring information") from the RAID device 500, and determines whether the RAID device 500 executes mirroring by itself based on the acquired mirroring information.

As shown in FIG. 5, if "Synchronized" is stated in the mirroring information, it indicates that the RAID device 500 itself is executing mirroring with the RAID device 600. If "Synchronized" is not stated, it indicates that the RAID device 500 does not independently execute mirroring.

The mirroring determination unit 170 notifies the shared-class setting unit 150 of a determination result. When the RAID device 500 is independently executing mirroring, the shared-class setting unit 150 sets a shared class by using the method according to the embodiment, while the RAID device 500 does not independently execute mirroring, the shared-class setting unit 150 sets a shared class according to a conventional method.

Processing of setting a shared class by the RAID management unit 120 is explained below. As shown in FIG. 6, the RAID management unit 120 receives a command for the shared-class setting unit 150 to set a shared class by including the disks 1 and 2 (step S101), and determines whether the RAID management unit 120 can refer to the disks 1 and 2 (step S102).

If the RAID management unit 120 can refer to both of the disks 1 and 2 (Yes at step S102), the shared-class setting unit 150 sets a shared class in a conventional manner (step S103).

By contrast, if the RAID management unit 120 cannot refer to at least one of the disks 1 and 2 (No at step S102), the RAID management unit 120 determines whether the command to set a shared class includes information about the RAID management unit 120 corresponding to the disk 1 and the RAID management unit 220 corresponding to the disk 2 (step S104).

If the command does not include the information about the RAID management units 120 and 220 (No at step S104), the processing is terminated. By contrast, if the command includes the information about the RAID management units 120 and 220 (Yes at step S104), the RAID management unit 120 determines whether the RAID management unit 120 and the RAID management unit 220 can refer to the disk 1 and the disk 2, respectively (step S105).

If the RAID management units 120 and 220 cannot refer to the respective disks (No at step S105), the processing is terminated. By contrast, if the RAID management units 120 and 220 can refer to the respective disks (Yes at step S105), the mirroring determination unit 170 determines whether the disks 1 and 2 are subjected to the mirroring function of the RAID devices (step S106).

If the disks 1 and 2 are not subjected to the mirroring function (No at step S106), the processing is terminated. By contrast, if the disks 1 and 2 are subjected to the mirroring function (Yes at step S106), the shared management-information creating unit 160 creates shared management information about a shared class that includes the disks 1 and 2, and records the shared management information onto the disk 1, which is connected to the RAID management unit 120, which has received the instruction from a user (step S107).

The shared management-information creating unit 160 then notifies the RAID management unit 220 of the shared management information, and gives an instruction to write the notified shared management information onto the disk 2 (step S108), and then the RAID management unit 220 writes the shared management information onto the disk 2 (step S109).

Thus, even if the RAID management unit 120 cannot directly access the disks 1 and 2, the RAID management unit 120 can set the shared class by including the disks 1 and 2.

In addition, even if the RAID device 500 copies data on the disk 1 as it is directly to the disk 2, the management information on the disk 2 is not destroyed, so that the RAID management unit 220 can access the disk 2 after copying.

The RAID management system according to the embodiment has been described in a case where the system includes two servers, namely, the servers 100 and 200, and two RAID devices, namely, the RAID devices 500 and 600. However, the present invention is not limited to this, and the RAID management system can include the same number of servers and RAID devices more than two.

Each of the processes explained above can be implemented by executing a computer program (hereinafter, "a RAID management program") on a computer. In the following, an example of a, computer that executes a RAID management program that has similar functions to the above embodiment is explained.

As shown in FIG. 7, a computer 30 as a RAID management apparatus includes a LAN interface 31, a RAID interface 32, a random access memory (RAM) 33, a hard disk drive (HDD) 34, and a central processing unit (CPU) 35, all of which are connected with a bus 36. The LAN interface 31 is configured to communicate with another RAID management apparatus by using a certain protocol, and the RAID interface 32 is configured to communicate with a RAID device by using a certain protocol.

The HDD 34 pre-stores therein RAID management programs, namely, a RAID management program 34a and an I/O processing program 34b, as shown in FIG. 7, which serve similar functions to those described in the above embodiment.

The CPU 35 then reads out the programs 34a and 34b from the HDD 34, and executes them as a RAID management program 33a and an I/O processing program 33c via the RAM 33. Consequently, as shown in FIG. 7, the programs 34a and 34b serve functions of a RAID management process 35a and an I/O processing process 35b, respectively. The RAID management process 35a corresponds to the shared-class setting unit 150, the shared management-information creating unit 160, and the mirroring determination unit 170 shown in FIG. 2. The I/O processing process 35b corresponds to the I/O processing unit 140 shown in FIG. 2.

On the RAM 33, as shown in FIG. 7, shared management information 33b is recorded in the RAID management program 33a. The shared management information 33b corresponds to the shared management information shown in FIG. 4. The CPU 35 writes shared management information onto a disk, and sets a shared class.

The programs 34a and 34b do not need to be initially stored in the HDD 34. That is, the programs can be stored in, for example, a portable physical medium configured to be inserted into a computer, such as a flexible disk (FD), a compact disk read only memory (CD-ROM), a digital versatile disk (DVD), a magneto-optical disk (MO), and an integrated circuit (IC) card. Alternatively, the programs can be stored in a fixed physical medium, such as a hard disk drive (HDD) provided in or out of the computer 30. Alternatively, the programs can be stored in another computer (or a server) that is connected to the computer 30 via a public line, the Internet, a local area network (LAN), or a wide area network (WAN). The computer 30 can read out each of the programs from one of these, and execute the program.

According to an aspect of the present invention, even when the RAID device executes mirroring by itself, a shared class can be set by including a copy source disk and a copy destination disk.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable, non-transitory medium that stores therein a computer program for managing a plurality of devices used for a redundant array of independent disks (RAID devices) configured to perform reciprocal mirroring, the computer program causing a computer to execute:

acquiring node information about nodes connected to respective RAID devices, the nodes being configured to write data onto the independent disks included in the respective RAID devices;

registering the independent disks as a shared class based on the node information, the independent disks belonging to different RAID devices being connected to each other via the nodes;

receiving a setting signal for making the independent disks in a shared status, the setting signal including relation information of a disk and a node that can refer to the disk;

acquiring mirroring information indicating whether the RAID devices execute mirroring by itself;

determining whether the RAID devices execute mirroring by itself based on the acquired mirroring information;

creating, in one of the nodes, shared management information that is used to achieve shared management of the independent disks based on the received setting signal when it is determined that the RAID devices execute mirroring by itself at the determining;

writing the shared management information onto one of the independent disks corresponding to the one of the nodes creating the shared management information; and notifying another node of the shared management information created to cause the other node to write the shared management information notified onto another independent disk corresponding to the other node.

2. A method of managing a plurality of devices used for a redundant array of independent disks (RAID devices) configured to perform reciprocal mirroring, the method comprising:

acquiring node information about nodes connected to respective RAID devices, the nodes being configured to write data onto the independent disks included in the respective RAID devices;

registering the independent disks as a shared class based on the node information, the independent disks belonging to different RAID devices being connected to each other via the nodes;

receiving a setting signal for making the independent disks in a shared status, the setting signal including relation information of a disk and a node that can refer to the disk;

acquiring mirroring information indicating whether the RAID devices execute mirroring by itself;

determining whether the RAID devices execute mirroring by itself based on the acquired mirroring information;

creating, in one of the nodes, shared management information that is used to achieve shared management of the independent disks based on the received setting signal when it is determined that the RAID devices execute mirroring by itself at the determining;

writing the shared management information onto one of the independent disks corresponding to the one of the nodes creating the shared management information;

notifying another node of the shared management information created; and writing the shared management information notified onto another independent disk corresponding to the other node.

3. A RAID management apparatus that manages a plurality of devices used for a redundant array of independent disks (RAID devices) configured to perform reciprocal mirroring, the RAID management apparatus comprising:

a first acquiring unit that acquires node information about nodes connected to respective RAID devices, the nodes being configured to write data onto the independent disks included in the respective RAID devices;

a registering unit that registers the independent disks as a shared class based on the node information, the independent disks belonging to different RAID devices connected each other via the nodes;

a receiving unit that receives a setting signal for making the independent disks in a shared status, the setting signal including relation information of a disk and a node that can refer to the disk;

a second acquiring unit that acquires mirroring information indicating whether the RAID devices execute mirroring by itself;

a determining unit that determines whether the RAID devices execute mirroring by itself based on the acquired mirroring information;

a creating unit that creates shared management information that is used to achieve shared management of the independent disks based on the received setting signal when it is determined by the determining unit that the RAID devices execute mirroring by itself, and notifies another RAID management apparatus of the shared management information created to cause the other RAID management apparatus to write the shared management information notified onto an independent disk corresponding to the other RAID management apparatus; and a writing unit that writes the shared management information onto an independent disk corresponding to the RAID management apparatus.

4. A computer-readable, non-transitory medium that stores therein a computer program used for a redundant storage system including a first pair of a first node and a first storage unit and a second pair of a second node and a second storage unit, data copy being able to be made between the first storage unit and the second storage unit, the computer program causing the first node to execute a procedure, the procedure comprising:

Receiving a setting signal for making the first storage unit and the second storage unit in a shared status, the setting signal including relation information of a storage unit and a node that can refer to the storage unit;

acquiring mirroring information indicating whether the RAID devices execute mirroring by itself;

determining whether the RAID devices execute mirroring by itself based on the acquired mirroring information;

generating management information to be stored in the first storage unit and the second storage unit based on the received setting signal when it is determined that the RAID devices execute mirroring by itself at the determining, the management information including corresponding information between the storage unit and the node; and notifying the second node of the management information to cause the second node to store the management information in the second storage unit.

5. A first node that manages a first storage unit, data copy being able to be made between the first storage unit and a second storage unit that is managed by a second node for redundant storage, the first node comprising:

a receiving unit that receives a setting signal for making the first storage unit and the second storage unit in a shared status, the setting signal including relation information of a storage unit and a node that can refer to the storage unit;

an acquiring unit that acquires mirroring information indicating whether the RAID devices execute mirroring by itself;

a determining unit that determines whether the RAID devices execute mirroring by itself based on the acquired mirroring information;

a generating unit that generates management information to be stored in the first storage unit and the second storage unit based on the received setting signal when it is determined by the determining unit that the RAID devices execute mirroring by itself, the management information including corresponding information between the storage unit and the node; and a notifying unit that notifies the second node of the management information to cause the second node to store the management information in the second storage unit.

* * * * *